(12) United States Patent
Dellinger et al.

(10) Patent No.: US 8,924,585 B2
(45) Date of Patent: Dec. 30, 2014

(54) METHOD FOR OPTIMIZING TRANSPORT CHANNELS OF DEVICES

(75) Inventors: Richard R. Dellinger, San Francisco, CA (US); Tito Thomas, San Jose, CA (US); Brian J. Tucker, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 13/187,162

(22) Filed: Jul. 20, 2011

(65) Prior Publication Data

US 2012/0311176 A1 Dec. 6, 2012

Related U.S. Application Data

(60) Provisional application No. 61/493,273, filed on Jun. 3, 2011.

(51) Int. Cl.
| | | |
|---|---|---|
| *G06F 15/16* | (2006.01) | |
| *H04M 15/00* | (2006.01) | |
| *H04L 29/06* | (2006.01) | |
| *H04W 36/26* | (2009.01) | |
| *H04L 12/14* | (2006.01) | |
| *H04M 1/725* | (2006.01) | |
| *H04W 36/14* | (2009.01) | |
| *H04W 88/06* | (2009.01) | |

(52) U.S. Cl.
CPC ......... *H04L 12/145* (2013.01); *H04M 15/8044* (2013.01); *H04M 1/7253* (2013.01); *H04W 36/14* (2013.01); *H04L 69/18* (2013.01); *H04W 88/06* (2013.01); *H04W 36/26* (2013.01); *H04M 15/8055* (2013.01); *H04L 69/24* (2013.01)
USPC .......................................... 709/232; 709/228

(58) Field of Classification Search
None
See application file for complete search history.

(56) References Cited

U.S. PATENT DOCUMENTS

| 7,701,970 B2 | 4/2010 | Krits et al. | |
|---|---|---|---|
| 7,944,901 B2 * | 5/2011 | Souissi et al. | 370/338 |

(Continued)

FOREIGN PATENT DOCUMENTS

EP 2252115 A1 * 11/2010 ............ H04W 48/18

OTHER PUBLICATIONS

Patrick Lane, Wi-Fi Tethering with a Smartphone: Create Your Own Hotspot, Apr. 15, 2011, http://itpro.comptia.org/networking/b/weblog/archive/2011/04/15/wi-fi-tethering-with-a-smartphone-create-your-own-hotspot.aspx.*

(Continued)

*Primary Examiner* — Jeffery Williams
*Assistant Examiner* — Christopher C Harris
(74) *Attorney, Agent, or Firm* — Park, Vaughan, Fleming & Dowler LLP

(57) ABSTRACT

A first device and a second device communicate with each other using a first communications protocol over a first communications media. The first device detects a need to modify a communications bandwidth with the second device based on an operating condition of the first device at a point in time. The first device negotiates with the second device to identify a second communications protocol that is suitable for the operating condition based on a set of one or more rules associated with the first device. Both the first and second devices switch, without user intervention, from the first communications protocol to the second communications protocol to communicate with the second device using the second communications protocol over a second communications media.

24 Claims, 8 Drawing Sheets

(56) References Cited

U.S. PATENT DOCUMENTS

| | | | |
|---|---|---|---|
| 8,086,260 B2* | 12/2011 | Biehler | 455/525 |
| 2006/0145883 A1* | 7/2006 | Fong et al. | 340/686.6 |
| 2007/0037609 A1* | 2/2007 | Zhang et al. | 455/574 |
| 2007/0266173 A1 | 11/2007 | Wong et al. | |
| 2010/0014459 A1 | 1/2010 | Mir et al. | |
| 2010/0020822 A1 | 1/2010 | Zerillo et al. | |
| 2010/0191994 A1* | 7/2010 | Nurminen et al. | 713/323 |
| 2010/0330907 A1* | 12/2010 | Feng | 455/41.2 |
| 2011/0040899 A1 | 2/2011 | Yepez et al. | |
| 2011/0096726 A1* | 4/2011 | Schlack | 370/328 |
| 2011/0106954 A1* | 5/2011 | Chatterjee et al. | 709/227 |
| 2012/0284393 A1* | 11/2012 | Gandhi et al. | 709/224 |
| 2014/0141733 A1* | 5/2014 | Wong et al. | 455/90.3 |

OTHER PUBLICATIONS

Gurun et al., Energy Consumption and Conservation in Mobile Peer-to-Peer Systems, Sep. 25, 2006, MobiShare, 6 Total Pages.*

* cited by examiner

METHOD FOR OPTIMIZING TRANSPORT CHANNELS OF DEVICES

RELATED APPLICATIONS

This application claims the benefit of U.S. Provisional Patent Application No. 61/493,273, filed Jun. 3, 2011, which is incorporated by reference in its entirety.

FIELD OF THE INVENTION

Embodiments of the present invention relate generally to peer-to-peer networking. More particularly, embodiments of the invention relate to optimizing transport channels of devices.

BACKGROUND

Devices such as electronic devices, computing systems, portable devices, and handheld devices have software applications such as game applications. Some of these applications are shared. For instance, multiple devices can participate in a game application in a collaborative fashion. In some configurations, a device can operate as both a standalone device and a gateway device or access point to allow another device to tether for accessing an external network such as the Internet. Tethering is a method to share the Internet connection of an Internet-capable mobile phone. This sharing can be via cable, or wirelessly over Bluetooth or Wi-Fi. If Wi-Fi, the tethering feature is often branded as a mobile hotspot and can typically service several devices.

In some situations, an electronic device may have multiple network interfaces that can communicate with multiple networks such as WiFi and Bluetooth networks. Sometimes one network interface (e.g., WiFi interface) may have a higher communication bandwidth or throughput than another network interface (e.g., Bluetooth interface), but it also requires higher power consumption. Conventional systems require a user to specifically switch between two transport communication mechanisms. There has been a lack of an efficient way to optimize the usage of these multiple network interfaces of a device.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
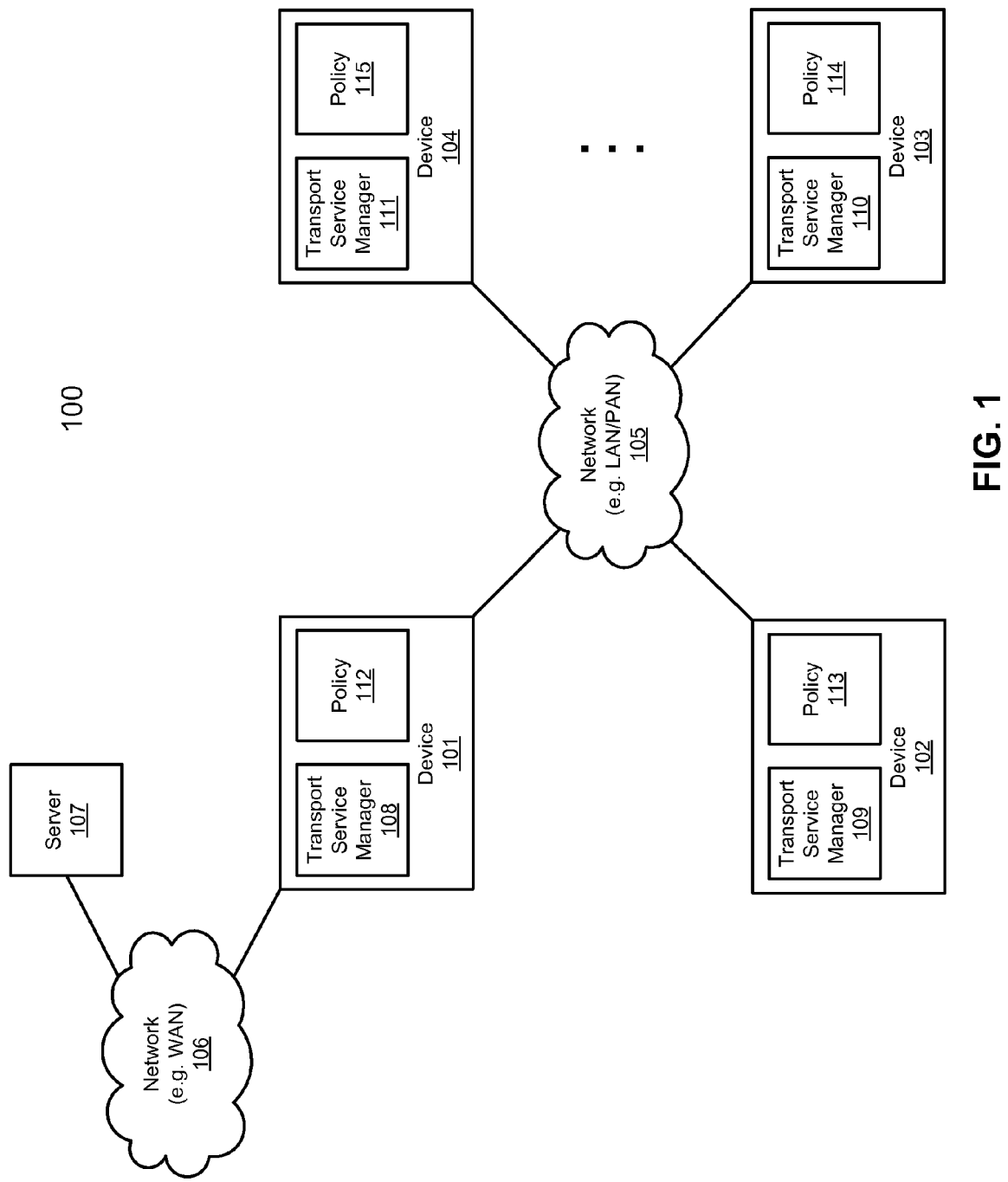
FIG. 1 is a network configuration which may be implemented with an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In some embodiments, a first device initially communicates with a second device using a first communications protocol (e.g., Bluetooth) over a first communications media (e.g., Bluetooth network) as a local area network (LAN) or a personal area network (PAN). In response to a detection of a change of an operating condition or environment, the first device is configured to negotiate with the second device to identify a second communications protocol (e.g., WiFi) that is suitable for the changed or new operating condition or environment based on a policy having a set of one or more rules configured or defined for the first device. The policy may define certain operating conditions under which a particular communications protocol should be utilized. The negotiation may also be performed in view a policy having a set of one or more rules associated with the second device. Once the second communications protocol has been negotiated and agreed upon between the first and second devices, both the first and second devices switch from the first communications protocol to the second communications protocol to communicate with each other over a second communications media (e.g., WiFi network). In one embodiment, the negotiation of the second communications protocol and the switching from the first communications protocol to the second communications protocol are performed automatically in response to the detection, without user intervention or knowledge.

In one embodiment, the first device may operate as a standalone device to communicate with another device over a LAN or PAN or to communicate with an access point (AP) or gateway for accessing an external network, for example, a wide area network (WAN) such as the Internet. Alternatively, the first device may operate as an access point or a gateway device (e.g., a WiFi hotspot) having an uplink interface coupled to an external network and a downlink interface coupled to other local devices such as the second device to allow other devices tethering to access an external network. In some embodiments, the change of operating condition may be detected due to a variety of factors including, but are not limited to, the power or battery condition, network bandwidth or throughput requirement for accessing a particular resource, a number of devices tethering through the first device, system resource usage or capacity, signal strength, and network traffic congestion, etc.

FIG. 1 is a network configuration which may be implemented with an embodiment of the invention. Referring to FIG. 1, network configuration 100 includes multiple electronic devices 101-104 communicatively coupled to network 105, which may be a wireless network such as a IEEE 802.11 (e.g., WiFi), a personal area network (PAN) compliant network (e.g., Bluetooth), or a wired network (e.g., traditional Ethernet). Any one of devices 101-104 may be any of portable devices, such as, for example, a portable computing device (e.g. notebook/netbook computers such as MacBook™ from Apple Inc. of Cupertino, Calif.), a tablet PC (e.g., an iPad™ from Apple Inc.), a cellular/smart phone (e.g., iPhone™ from Apple Inc.), a media player (e.g., iPod™ from Apple Inc.), a PDA, a copier/printer/scanner/modem/facsimile device, or a combination thereof. Alternatively, any one of devices 101-104 may be a desktop computer or other non-portal devices having a wireless (e.g., a built-in or plugged-in transceiver or RF frontend) and/or wired communications interface that are capable of communicating with another device in a wireless network and/or wired network.

In one embodiment, each of devices 101-104 includes a transport service manager (e.g., transport service managers 108-111) to monitor and detect a change of an operating condition of the device (e.g., power condition, network traffic condition, bandwidth or throughput demand, system resource usage/capacity, etc.), to negotiate an alternative communications protocol with one or more other devices based on a policy having one or more rules (e.g., policies 112-115), and to coordinate with other devices to switch from a first communications protocol of a first communications media (e.g., Bluetooth network) to a second communications protocol of a second communications media (e.g., WiFi network) such that all of devices 101-104 can communicate with each other over the second communications media using the second communications protocol. In one embodiment, a communications protocol used by devices 101-104 can be switched from a lower performance communications protocol to a higher performance communications protocol or vice versa, dependent upon the operating condition or status of devices 101-104 at the point in time. Such switching can be performed automatically without user intervention or user knowledge.

Note that typically, a higher bandwidth connection consumes more power while a lower bandwidth connection consumes less power. For higher performance, it is preferred to maintain a higher bandwidth connection; however, it consumes more power from a battery of the device. Therefore, it is desirable for a device to maintain a lower performance connection as long as possible. When there is a need to have a higher performance connection, the device then switches to the higher performance connection. When the higher performance connection is no longer needed, a device may switch back to a lower performance connection, for example, for conserving energy or battery life. Thus, a device may dynamically switch among different types of network communications dependent upon the operating environment at the point in time, without user intervention or user knowledge.

In one embodiment, each of devices 101-104 is capable of operating as a standalone device communicatively coupled to the rest of devices 101-104 over network 105, which may be a LAN, PAN, or a peer-to-peer network. In addition, at least one of devices 101-104 can also operate as an access point or gateway device to allow one or more other devices tethering to access a resource of external network 106, which may be a WAN, a metropolitan area network (MAN), another LAN, another network segment or domain, or a combination thereof. In the example as shown in FIG. 1, device 101 may operate as a gateway device having an uplink interface (not shown) coupled to external network 106 and a downlink interface (not shown) coupled to network 105 to allow devices 102-104 to tether accessing resource such as server 107 of external network 106.

In one embodiment, transport service manager 108 is configured to detect that there is a need to modify a bandwidth or throughput of network connections coupling with at least one of devices 102-104. For example, for the purpose of illustration only, when device 102 initiates to access a particular resource such as playing a particular game with device 101 or to download a stream of content (e.g., a movie) via device 101 from server 107 of external network 106, based on policy 112 and/or policy 113, transport service manager 108 and/or transport service 109 may determine that a higher bandwidth connection is needed. In this example, devices 101-102 may initially communicate with each other via a first communications connection, i.e., a lower bandwidth connection such as a Bluetooth connection. When it is determined that a higher bandwidth connection is needed, transport service manager 108 and transport service 109 negotiate a second communications connection such as a WiFi connection that is more suitable for the required bandwidth based on a set of rules or policy. Devices 101-102 then switch from the first communications protocol to the second communication protocol, for example, allowing both devices to play the game or allowing device 102 to download the content from an external network.

Similarly, according to one embodiment, when the higher performance connection is no longer needed, both devices may negotiate again to switch from a higher performance protocol to a lower performance protocol. In this way, the power consumption can be reduced. In the above example, when both devices finish playing a game or the content has been completely downloaded, the higher performance connection (e.g., WiFi connection) is no longer needed. In this situation, both devices may negotiate again to switch from the higher performance connection back to the lower performance connection (e.g., Bluetooth). Such detection, negotiation, and switching are performed automatically without user intervention or user knowledge.

In another scenario, according to one embodiment, a higher bandwidth connection may be needed if more devices (e.g., devices 103-104) attempt to tether through device 101 in order to access a resource of external network 106 such as server 107. In this situation, a lower bandwidth connection may only allow lower limited number of devices for tethering, while a higher bandwidth connection may allow higher limited number of devices for tethering. Thus, when a new device, in this example device 104, is discovered by device 101, for example, through service advertisement and discovery processes, transport service manager 108 is configured to determine whether a higher bandwidth communications media is needed based on policy 112. Policy 112 may specify that if the number of devices for tethering is greater than a predetermined threshold, a higher bandwidth communications media is needed. Based on policy 112, if it is determined a higher bandwidth connection is needed, device 101 and device 104, as well as existing devices 102-103, negotiate a higher bandwidth communications protocol to be utilized as long as all parties are capable of communicating using the negotiated communications protocol. Once the new communications protocol has been determined and agreed upon, all devices may switch onto the new communications protocol to communicate with one another over the associated communications media. Such detection, negotiation, and/or switching may be performed without user intervention or user knowledge.

Note that, a device can switch from a lower bandwidth connection to a higher bandwidth connection; it can also switch from a higher bandwidth connection to a lower bandwidth connection as needed dependent upon the circumstances. In the above example, if one or more of the devices subsequently drop out of the network, device 101 may detect that the higher performance connection is no longer needed (e.g., number of devices tethering drops below a predetermined threshold). This situation can happen when one or more devices roam out of the communications range, are turned off, or leave the group, etc. In response to such detection, device 101 and the remaining devices may renegotiate a further appropriate communications protocol (e.g., lower bandwidth connection) and switch onto the further selected communications protocol. Again, such detection, negotiation, and/or switching may be performed without user intervention or user knowledge.

Alternatively, according to one embodiment, device 101 may detect that the uplink traffic congestion of network 106 becomes heavier and it may decide the current higher bandwidth connections associated with network 105 are no longer needed. One of the reasons is that the tethering traffic of local network 105 is limited by the traffic condition of external network 106. If the traffic condition of network 106 cannot fulfill the bandwidth requirements of the local network, there may be waste of the bandwidth on the local network. In this situation, it may be more appropriate for the devices of the local network to switch onto a lower bandwidth communications media, for example, for the purpose of consuming less power or reducing local traffic congestion, etc. Similarly, when the traffic congestion of the external network improves, the devices of the local network may switch back to a lower bandwidth connection. Again, the decision on the switching may be made based on policy 112 of device 101.

Further, bandwidth of the uplink connection of device 101 to external network 106 may be associated with the cost such as data rate or data plan subscribed by or associated with device 101. Such a data rate or data plan may be subject to different cost or pricing structures dependent upon the usage levels, time of a day, and/or date of the usage. If device 101 determines that the cost is about to reach another threshold which may cost more, according to one embodiment, device 101 may negotiate with other devices to switch over to a lower bandwidth or free connection to avoid the higher cost connections. On the other hand, if device 101 determines that there is room to reach next higher threshold, device 101 may decide to switch onto a higher bandwidth connection (e.g., 3G/4G connection) since it already paid for that (e.g., a flat fee monthly plan with predetermined amount of data or time in minutes).

Furthermore, according to one embodiment, a device may decide to switch from a higher performance communications protocol/media to a lower performance communications protocol/media in view of the power condition of the device. For example, if the remaining battery life of a battery of the device drops below a predetermined threshold, the device may negotiate with other devices to switch from a higher performance communications protocol/media to a lower performance communications protocol/media for the purpose of conserving battery energy. On the other hand, if a device detects that the device is connected with an external power source such as an AC power adapter or a solar power source, the device may switch from a lower performance communications protocol/media to a higher performance communications protocol/media.

As described above, when a device switches from a first communications protocol/media to a second communications protocol/media, the switching is performed without user intervention or user knowledge. That is, a user associated with the device may not notice of the underlying detection, negotiation, and switching of the transport mechanisms. According to one embodiment, when a device switches from a first communications media or network to a second communications media or network, the user is automatically authenticated for entering the second communications media or network without prompting the user for the required credentials. Since the user has been successfully authenticated when entering the first communications media or network, it is assumed that the user is also eligible for entering the second communications media or network. In a conventional system, a user is prompted for credentials every time entering a network. In a further embodiment, this may be implemented as an option in which a user can specify whether the credentials can be cached within the system and when switching from one transport to another transport, whether the system should prompt the user. These settings may be stored in a security profile associated with the user, which may or may not be encrypted.

According to some embodiments, the negotiation capability of a device with another device can literally extend the device's capability beyond its originally designed functionality. For example, a mobile device may include a third party application running therein that can communicate with an external monitoring device such as healthcare monitoring device (e.g., heart monitoring device) over a variety of communications protocols over a variety of communications medias. The application may be designed to receive signals from the monitoring device and to control the monitoring device. Through transport service manager via an application programming interface (API), the application and the monitoring device can switch among different communications protocols dependent upon the circumstances. For example, during normal operations, the monitoring device and the application of a mobile device can communicate using Bluetooth protocol. When the monitoring device and the mobile move apart from each other that the signal strength drops below a predetermined threshold, they may switch from Bluetooth to WiFi. Subsequently, when they move towards each other, they can also switch from WiFi back to Bluetooth.

The communications capability between a monitoring device or sensor and a mobile device can be applied to a variety of situations. For example, a plant sensor can sense that the plant needs water and the sensor may transmit a signal to an associated mobile device notifying a user of the mobile device it is time to water the plant. A mobile device can also communicate with a digital key for entering a house in which the mobile device can program and authorize the digital key to be valid for a specific period of time during which the key can open the door of a house, etc.

Figure 2:
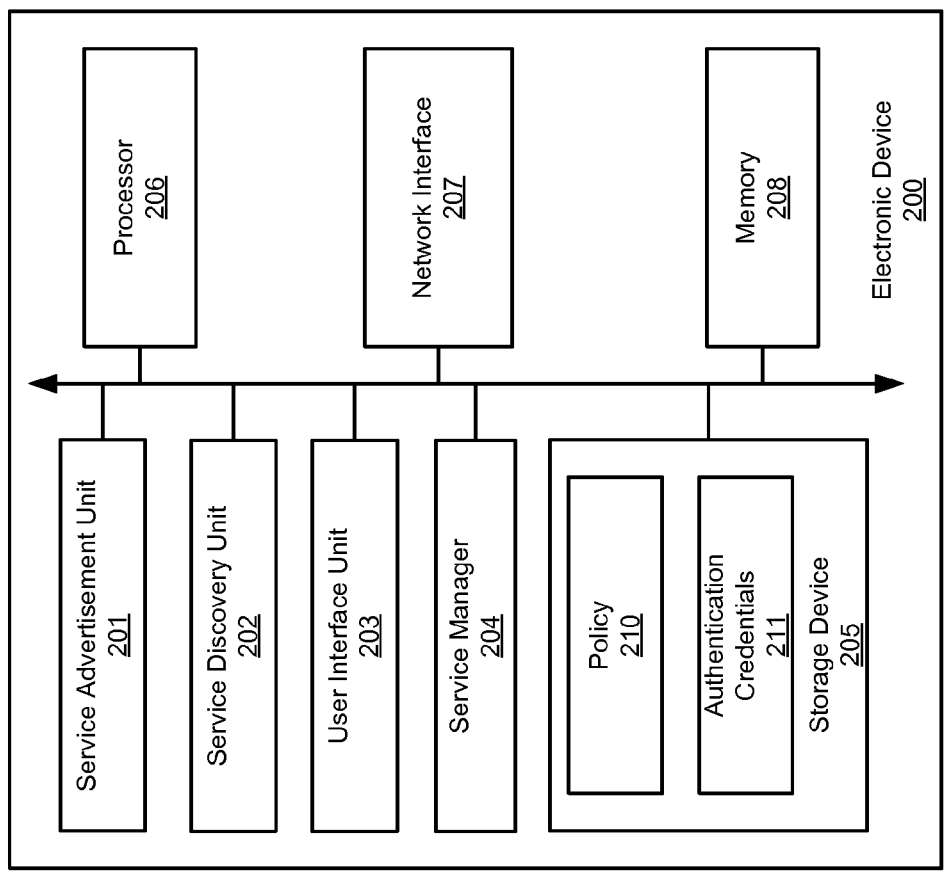
FIG. 2 is a block diagram illustrating an example of an electronic device according to one embodiment of the invention.

FIG. 2 is a block diagram illustrating an example of an electronic device according to one embodiment of the invention. For example, electronic device 200 may be implemented as a part of any one of devices 101-104 of FIG. 1. Referring to FIG. 2, device 200 includes, but not limited to, service advertisement unit 201, service discovery unit 202, service management unit 204, storage device 205, one or more processors or processor cores 206, network interface unit 207, and memory 208 coupled to each other via bus, interconnect, or mesh 209.

Processor 206 may be any kind of microprocessors, which may be a single processor, multiple processors, or multiple processor cores. Network interface unit 207 may be part of an RF frontend including, but is not limited to a wireless transceiver and an antenna or a modem, etc. Alternatively, network interface unit 207 may also include a wired communications interface, such as Ethernet port, a universal serial bus (USB)

or Firewire™ port. Memory 208 may be any kind of random access memory (RAM), which is typically implemented as a volatile user memory. Device 200 may further include user interface unit 203 may include a display device, an input device (e.g., keyboard, a touch pad, a touch screen, a stylus device, or a combination thereof), and an audio and/or video interfaces, etc.

Service advertisement unit 201 is responsible for advertising one or more services available or provided by device 200. In one embodiment, service advertisement unit 201 is configured to advertise, via network interface unit 207, one or more services by broadcasting or multicasting an advertisement in the network (e.g., network 105 of FIG. 1) according to an advertisement schedule (e.g., advertisement period). An advertisement may include one or more service identifiers (IDs) identifying a service that is potentially provided by device 200. For example, service advertisement unit 201 may broadcast an advertisement in the network indicating that device 200 is operating as an access point or gateway to an external network and can provide a hotspot service to other devices in the network, for example, for the purpose of tethering. Similarly, service discovery unit 202 is responsible for discovering one or more services available from the network, which may be advertised by one or more other devices in the network. In response to an advertisement from a remote device, service discovery unit 202 is configured to communicate, via network interface unit 207, with the remote device to acquire further detailed information of the services. Further detailed information concerning techniques for service discovery and advertisement can be found in co-pending U.S. patent application Ser. No. 12/987,954, entitled "Efficient Service Advertisement and Discovery in Multiple Wireless Networks," filed Jan. 10, 2011, which is incorporated by reference herein in its entirety.

Service manager 204 may be implemented as part of any of transport service managers 108-111 of FIG. 1. In one embodiment, service manager 204 is configured to monitor operating conditions of device 200, as well as network traffic conditions. When service manager 204 detects a change of an operating condition of device 200 or network traffic condition that warrants a change or modification of communications protocols used by device 200, service manager 204 is configured to communicate with other devices to negotiate an alternative communications protocol or media that is suitable for the current operating condition or network environment based on policy 210. Once the new communications protocol has been negotiated and agreed upon, service manager 204 causes network interface 207 switch from one communications protocol as shown in FIG. 3A to another communications protocol as shown in FIG. 3B.

Figure 3A:
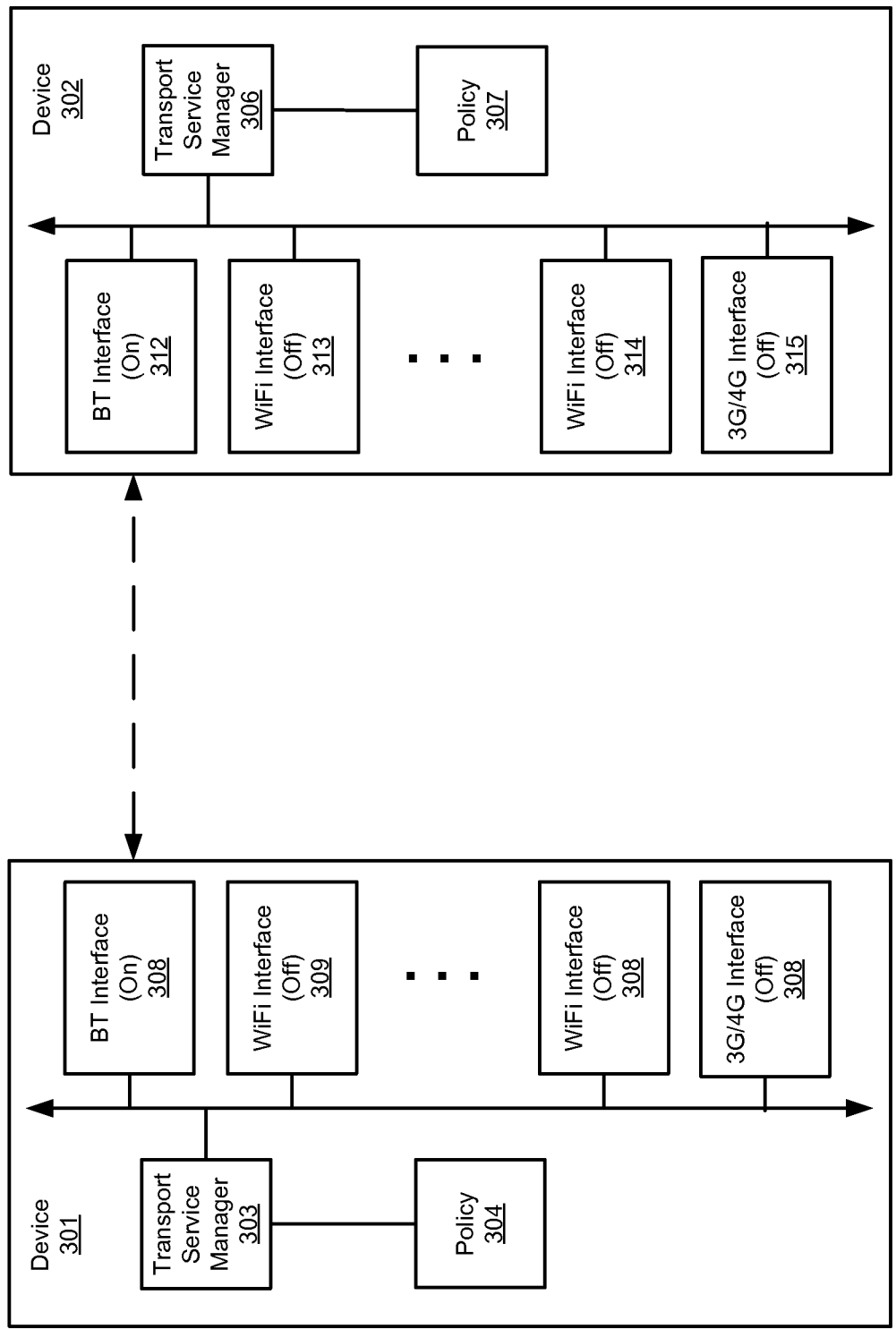
FIGS. 3A and 3B are block diagrams illustrating examples of switching among multiple communications protocols between two devices according to some embodiments of the invention.
Figure 3B:
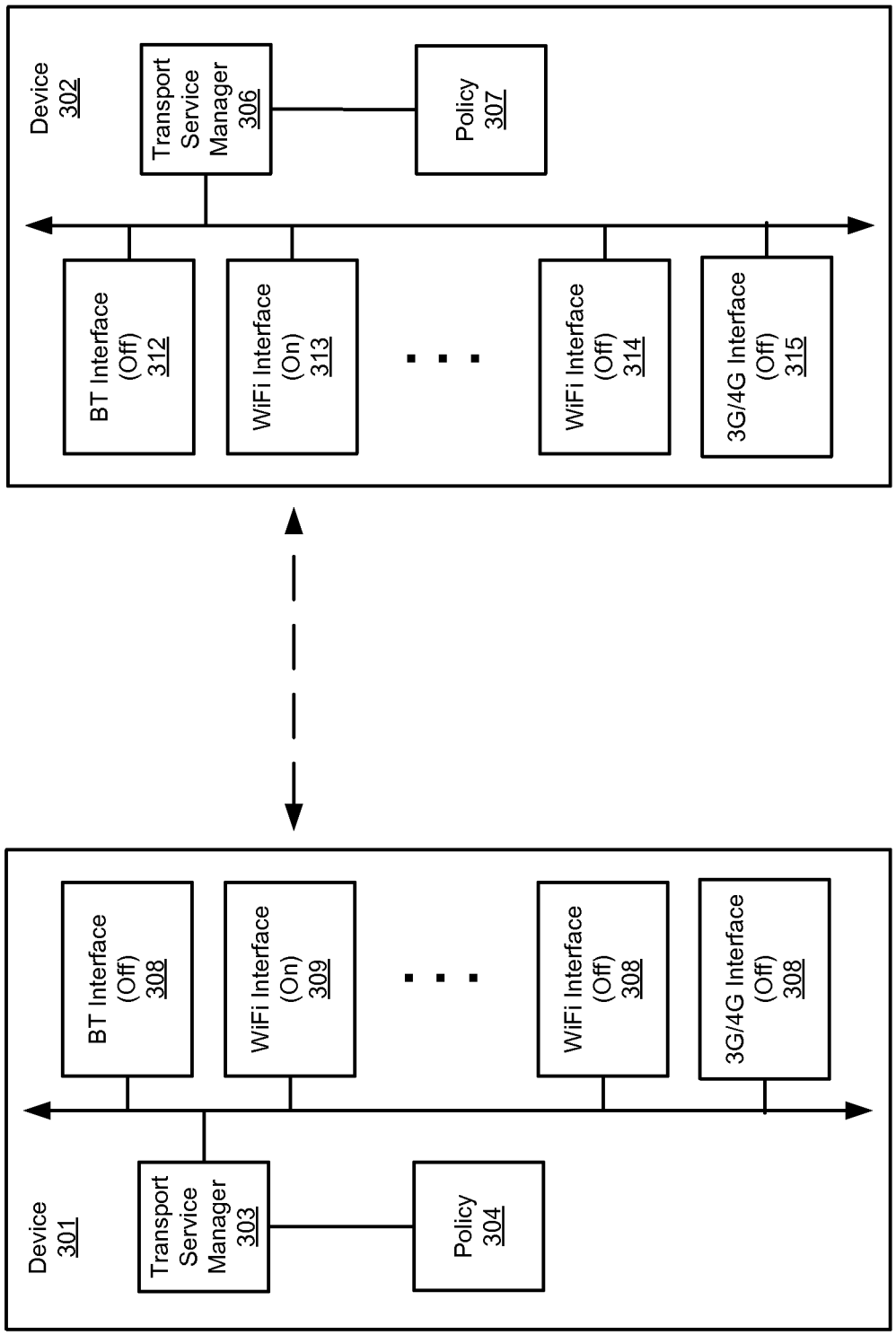

Referring to FIGS. 3A-3B, each of devices 301-302 is capable of communicating with each other via multiple communications interfaces 308-311 and 312-315, respectively. It is assumed that initially, as shown in FIG. 3A, devices 301-302 communicate with each other using communications interfaces 308 and 312, respectively. When either or both service managers 303 and 306 detects there is a need to change the communications protocol, service managers 303 and 306 negotiate with each other to determine an alternative communications protocol that is appropriate at the point in time based on policy 304 and/or policy 307. Once a new communications protocol has been negotiated and agreed upon, both devices 301-302 switch to the new network interface as shown in FIG. 3B.

Figure 4:
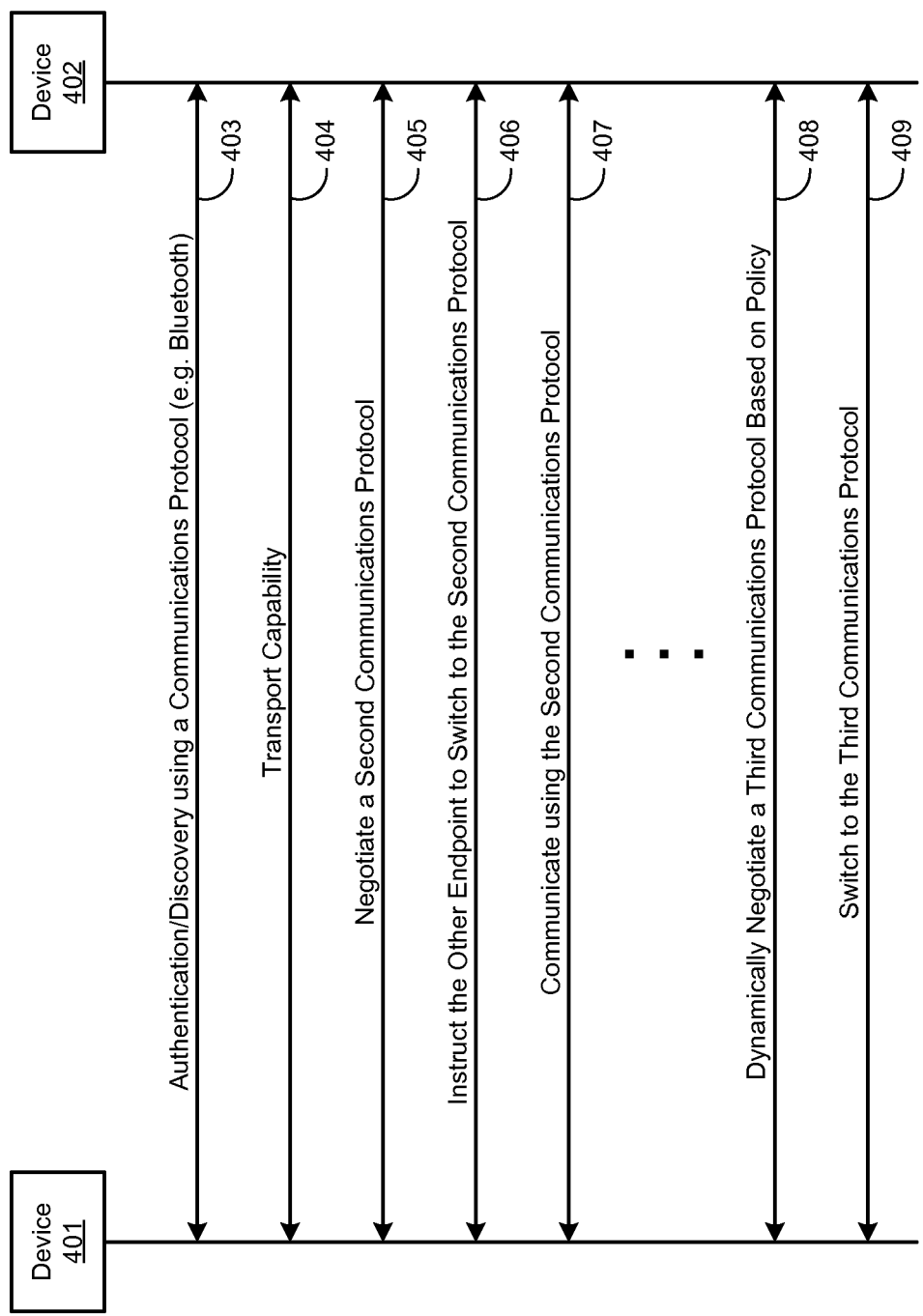
FIG. 4 is a transactional diagram illustrating a process for optimizing communications channels according to one embodiment of the invention.

FIG. 4 is a transactional diagram illustrating a process for optimizing communications channels according to one embodiment of the invention. Referring to FIG. 4, devices 401-402 can represent any of devices 101-104 of FIG. 1. Initially, during transaction 403, devices 401-402 communicate with each other using a first communications protocol over a first communications media (e.g., Bluetooth), for example, for service discovery and/or service advertisement. In response to detection of a change of operating conditions or network environment, during transaction 404, devices 401-402 exchange messages to determine transport capability of each of devices 401-402. The capability of transports may be indicated via a bitmap having multiple bits, each bit having a predetermined logical value indicating whether a particular transport is supported by the respective device. During transaction 405, devices 401-402 negotiates a second communications protocol that s suitable for the new operating condition based on a policy having a set of one or more rules. Once the new communications protocol has been negotiated, during transaction 406, each of devices 401-402 signals the other endpoint to switch from the first communications protocol to the second communications protocol. Thereafter, during transaction 407, both devices 401-402 communicate with each other using the second communications protocol over a second communications media. Subsequently, during transactions 408-409, devices 401-402 may further detect and dynamically switch back to the first communications protocol or switch to another communications protocol as needed.

Figure 5:
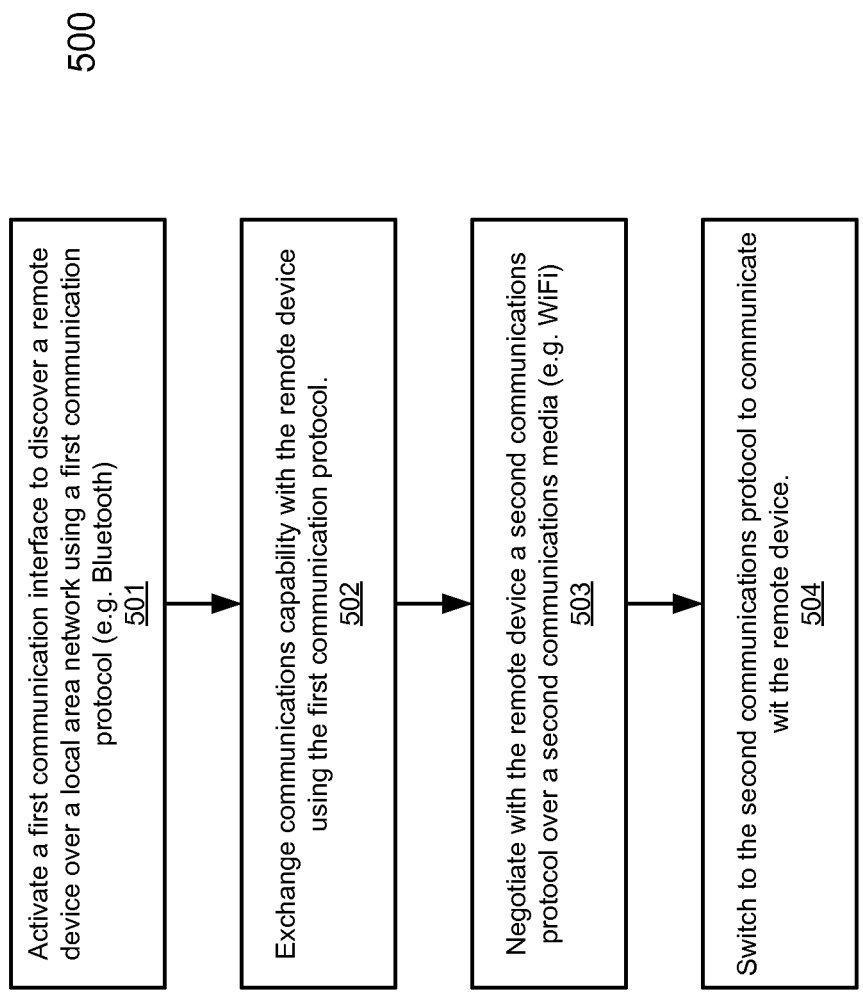
FIG. 5 is a flow diagram illustrating a method for optimizing transport according to one embodiment of the invention.

FIG. 5 is a flow diagram illustrating a method for optimizing transport according to one embodiment of the invention. Method 500 may be performed by any of devices 101-104 of FIG. 1. Referring to FIG. 5, at block 501, a local device activates a first communications interface to discover a remote device over a local area network using a first communications protocol (e.g., Bluetooth). At block 502, the local device exchanges messages with the remote device concerning communications capability using the first communications protocol. At block 503, the local device negotiates with the remote device a second communications protocol (e.g., WiFi) based on a set of rules, where the second communications protocol is supported by both the local and remote devices based on the capabilities of both devices. At block 504, the local device and the remote device switch from the first communications protocol to negotiated second communications protocol to communicate with each other over a second communications media, without user intervention or user knowledge.

Figure 6:
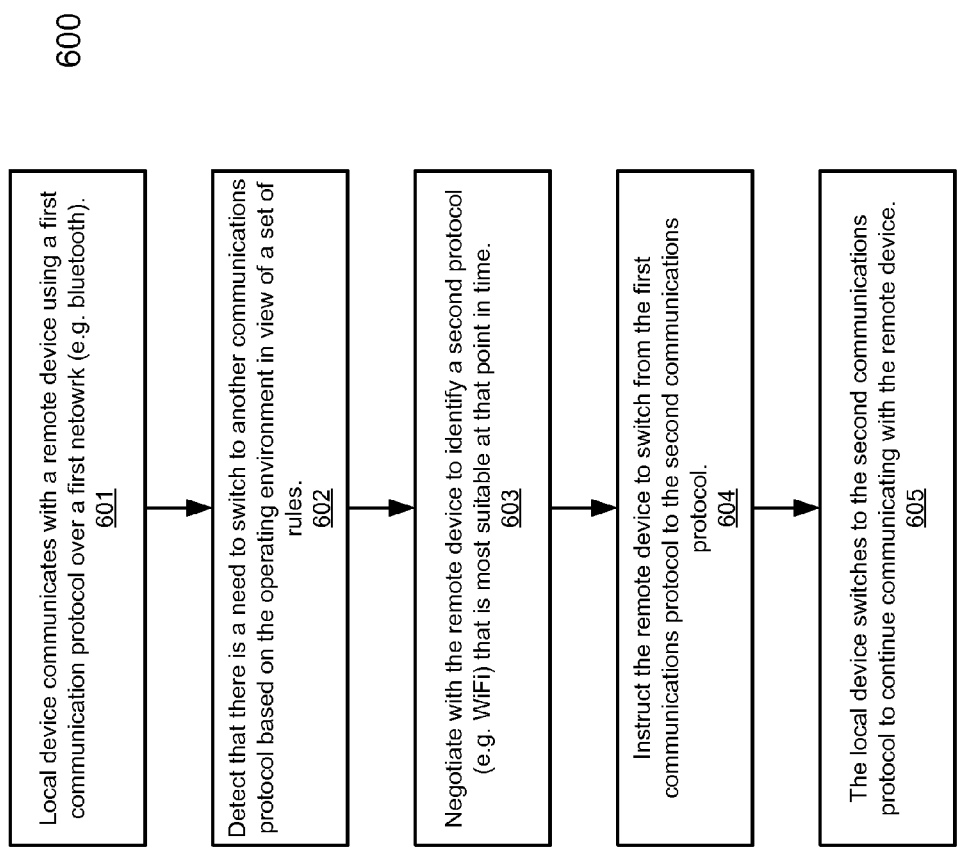
FIG. 6 is a flow diagram illustrating a method for optimizing transport according to another embodiment of the invention.

FIG. 6 is a flow diagram illustrating a method for optimizing transport according to another embodiment of the invention. Method 600 may be performed by any of devices 101-104 of FIG. 1. Referring to FIG. 6, at block 601, a first device communicates with a second device using a first communications protocol over a first communications media (e.g., Bluetooth). At block 602, one or both of the devices detect that there is a need of switching to another communications protocol based on the operating environment. A need of switching can be due to a variety of factors, such as, a demand for higher performance connections, power condition, network traffic conditions, system resource usages, etc. At block 603, the first and second devices negotiate to identify a second communications protocol (e.g., WiFi) that is most appropriate at the point in time. The second communications protocol may be identified or selected based on a set of rules in view of the current operating condition (e.g., a demand for higher performance connections, power condition, network traffic conditions, system resource usages, etc.) Once the second communications protocol has been negotiated and agreed upon, at block 604, the first device and the second device signal to each other indicating the devices are ready to switch. At block 605, both devices switch from the first communications protocol to the second communications protocol and start communicating with each over a second communication media (e.g., WiFi network).

Figure 7:
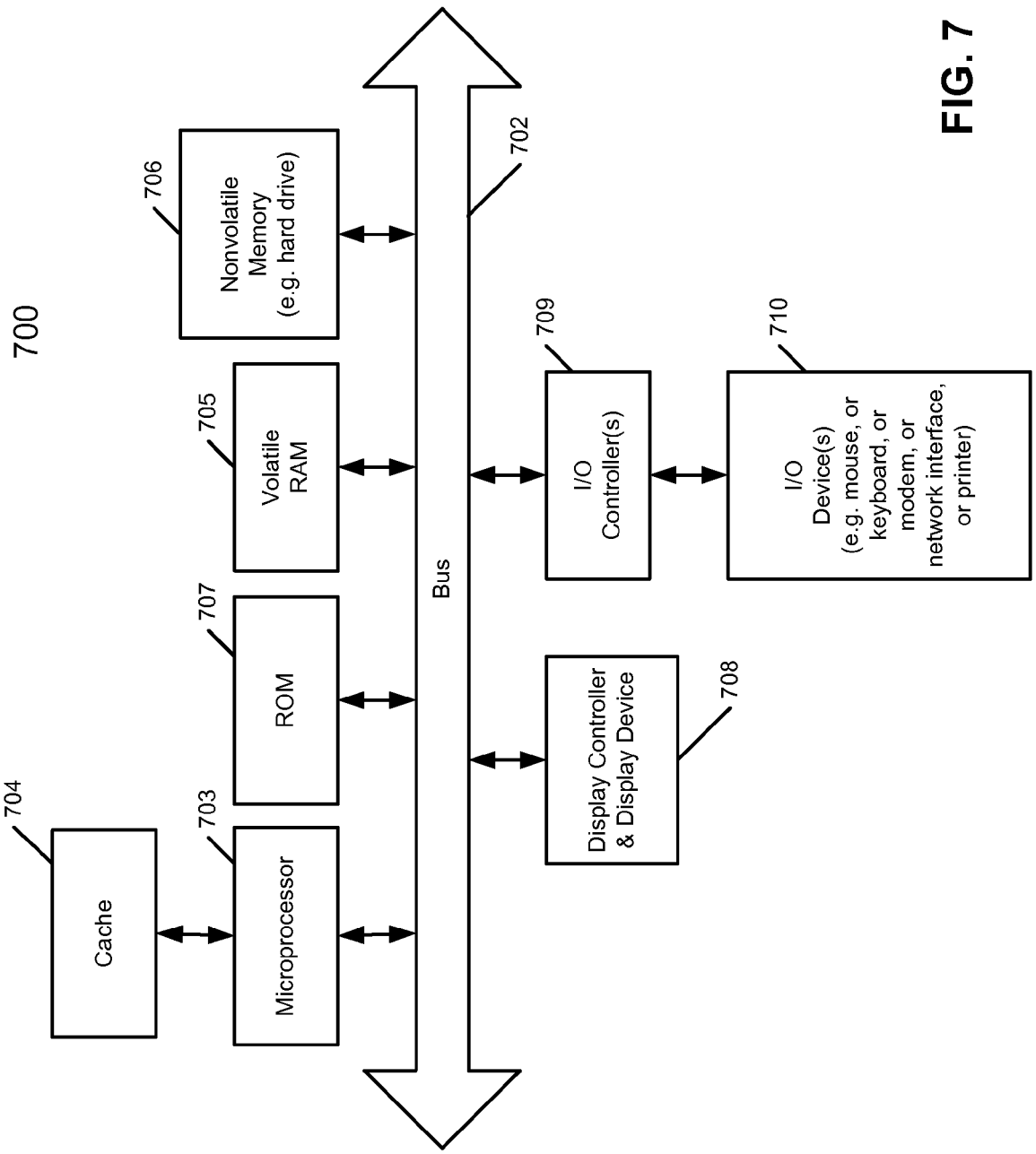
FIG. 7 is a block diagram of a data processing system, which may be used with one embodiment of the invention.

FIG. 7 is a block diagram of a data processing system, which may be used with one embodiment of the invention. For example, the system 700 may be used as part of any of devices 101-104 as shown in FIG. 1. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple Macintosh computer or MacBook, an IBM compatible PC, or a computer server.

As shown in FIG. 7, the computer system 700, which is a form of a data processing system, includes a bus or interconnect 702 which is coupled to one or more microprocessors 703 and a ROM 707, a volatile RAM 705, and a non-volatile memory 706. The microprocessor 703 is coupled to cache memory 704. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   communicating between a first device and a second device using a first communications protocol over a first communications media;
   detecting, by the first device, a need for a higher bandwidth connection with the second device based on an operating condition of the first device at a first point in time;
   negotiating by the first device with the second device to select a second communications protocol that is suitable for the operating condition based on a set of one or more rules associated with the first device, wherein the second communications protocol provides more bandwidth and uses more energy than the first communications protocol;
   switching, without user intervention, from the first communications protocol to the second communications protocol to communicate with the second device using the second communications protocol over a second communications media;
   detecting, by the first device, an opportunity to conserve energy based on an operating condition of the first device at a second point in time;
   negotiating by the first device with the second device to reselect the first communications protocol; and switching, without user intervention, from the second communications protocol to the first communications protocol to communicate with the second device using the first communications protocol over the first communications media.

2. The method of claim 1, wherein negotiating between the first device and the second device comprises:
exchanging one or more messages between the first device and the second device to determine a list of communications protocols that are supported by both the first device and the second device; and
selecting the second communications protocol from the list of communications protocols based on the set of one or more rules in view of the operating condition of the first device.

3. The method of claim 1, wherein the set of one or more rules define a plurality of operating conditions under which a particular communications protocol should be used.

4. The method of claim 1, wherein the first device operates as one of an access point and a gateway device to allow the second device to access an external network via the first device.

5. The method of claim 4, wherein the first device and the second device are mobile devices capable of communicating using multiple communications protocols.

6. The method of claim 4, wherein the need to modify the bandwidth is detected in response to a request received from the second device for accessing a resource of the external network, wherein accessing of the resource requires a different bandwidth of a network connection between the first and second devices.

7. The method of claim 4, wherein the need to modify the bandwidth is detected in response to a change of a throughput of an uplink interface of the first device coupled to the external network.

8. The method of claim 4, wherein the need to modify the bandwidth is detected in response to a request received from a third device for accessing the external network via the first device.

9. The method of claim 1, wherein the need to modify the bandwidth is detected based on at least one of a power condition of the first device, system resource usage of the first device, signal strength received by the first device, and cost to communicate over the first communications media.

10. The method of claim 1, wherein switching from the first communications protocol to the second communications protocol is performed without having to prompt a user of the first device to enter credentials for authentication for a purpose of communicating over the second communications media, and wherein the user is automatically authenticated based on previous successful authentication of the user over the first communications media.

11. A non-transitory computer-readable storage medium having instructions stored therein, which when executed by a computer, cause the computer to perform a method, the method comprising:
communicating between a first device and a second device using a first communications protocol over a first communications media;
detecting, by the first device, a need for a higher bandwidth connection with the second device based on an operating condition of the first device at a first point in time;
negotiating by the first device with the second device to select a second communications protocol that is suitable for the operating condition based on a set of one or more rules associated with the first device, wherein the second communications protocol provides more bandwidth and uses more energy than the first communications protocol;
switching, without user intervention, from the first communications protocol to the second communications protocol to communicate with the second device using the second communications protocol over a second communications media;
detecting, by the first device, an opportunity to conserve energy based on an operating condition of the first device at a second point in time;
negotiating by the first device with the second device to reselect the first communications protocol; and
switching, without user intervention, from the second communications protocol to the first communications protocol to communicate with the second device using the first communications protocol over the first communications media.

12. The computer-readable storage medium of claim 11, wherein negotiating between the first device and the second device comprises:
exchanging one or more messages between the first device and the second device to determine a list of communications protocols that are supported by both the first device and the second device; and
selecting the second communications protocol from the list of communications protocols based on the set of one or more rules in view of the operating condition of the first device.

13. The computer-readable storage medium of claim 11, wherein the set of one or more rules define a plurality of operating conditions under which a particular communications protocol should be used.

14. The computer-readable storage medium of claim 11, wherein the first device operates as one of an access point and a gateway device to allow the second device to access an external network via the first device.

15. The computer-readable storage medium of claim 14, wherein the first device and the second device are mobile devices capable of communicating using multiple communications protocols.

16. The computer-readable storage medium of claim 14, wherein the need to modify the bandwidth is detected in response to a request received from the second device for accessing a resource of the external network, wherein accessing of the resource requires a different bandwidth of a network connection between the first and second devices.

17. The computer-readable storage medium of claim 14, wherein the need to modify the bandwidth is detected in response to a change of a throughput of an uplink interface of the first device coupled to the external network.

18. The computer-readable storage medium of claim 14, wherein the need to modify the bandwidth is detected in response to a request received from a third device for accessing the external network via the first device.

19. The computer-readable storage medium of claim 11, wherein the need to modify the bandwidth is detected based on at least one of a power condition of the first device, system resource usage of the first device, signal strength received by the first device, and cost to communicate over the first communications media.

20. The computer-readable storage medium of claim 11, wherein switching from the first communications protocol to the second communications protocol is performed without having to prompt a user of the first device to enter credentials for authentication for a purpose of communicating over the second communications media, and wherein the user is automatically authenticated based on previous successful authentication of the user over the first communications media.

21. An apparatus, comprising:
a processor; and
a memory coupled to the processor to store instructions, which when executed by the processor, cause the processor to
communicate with a remote device using a first communications protocol over a first communications media,
detect a need for a higher bandwidth connection with the remote device based on an operating condition at a first point in time;
negotiate with the remote device to select a second communications protocol that is suitable for the operating condition based on a set of one or more rules, wherein the second communications protocol provides more bandwidth and uses more energy than the first communications protocol;
switch, without user intervention, from the first communications protocol to the second communications protocol to communicate with the remote device using the second communications protocol over a second communications media,
detect an opportunity to conserve energy based on an operating condition at a second point in time;
negotiate with the remote device to reselect the first communications protocol; and
switch, without user intervention, from the second communications protocol to the first communications protocol to communicate with the remote device using the first communications protocol over the first communications media.

22. The apparatus of claim 21, wherein negotiating with the remote device comprises:
exchanging one or more messages with the remote device to determine a list of communications protocols that are supported by both the apparatus and the remote device; and
selecting the second communications protocol from the list of communications protocols based on the set of one or more rules in view of the operating condition.

23. The apparatus of claim 21, wherein the set of one or more rules define a plurality of operating conditions under which a particular communications protocol should be used.

24. The apparatus of claim 21, wherein the apparatus operates as one of an access point and a gateway device to allow the remote device to access an external network via the apparatus.

* * * * *